(12) United States Patent
Wang

(10) Patent No.: US 8,411,090 B2
(45) Date of Patent: Apr. 2, 2013

(54) METHODS FOR FLATTENING A 3D SURFACE INTO A 2D PIECE

(75) Inventor: Changling Charlie Wang, Hong Kong (CN)

(73) Assignee: The Chinese University of Hong Kong, Hong Kong (HK)

( * ) Notice: Subject to any disclaimer, the term of this patent is extended or adjusted under 35 U.S.C. 154(b) by 998 days.

(21) Appl. No.: 12/199,551

(22) Filed: Aug. 27, 2008

(65) Prior Publication Data
US 2010/0054625 A1 Mar. 4, 2010

(51) Int. Cl.
*G06T 15/10* (2011.01)
(52) U.S. Cl. .................................................. 345/427
(58) Field of Classification Search .............. 345/427
See application file for complete search history.

(56) References Cited

U.S. PATENT DOCUMENTS

| | | | |
|---|---|---|---|
| 5,107,444 A | | 4/1992 | Wu |
| 5,448,687 A | | 9/1995 | Hoogerhyde et al. |
| 5,615,318 A | * | 3/1997 | Matsuura ............... 345/420 |
| 6,051,028 A | * | 4/2000 | McCartney et al. ........ 703/7 |
| 6,232,980 B1 | | 5/2001 | Liepa |
| 6,256,039 B1 | * | 7/2001 | Krishnamurthy ...... 345/420 |
| 6,300,958 B1 | | 10/2001 | Mallet |
| 6,697,538 B1 | | 2/2004 | Angenent et al. |
| 6,907,310 B2 | | 6/2005 | Gardner et al. |
| 7,224,356 B2 | | 5/2007 | Zhou et al. |
| 7,265,752 B2 | | 9/2007 | Sander et al. |
| 2001/0026272 A1 | * | 10/2001 | Feld et al. ............... 345/419 |
| 2004/0049309 A1 | | 3/2004 | Gardner et al. |
| 2006/0267978 A1 | | 11/2006 | Litke et al. |
| 2007/0244670 A1 | * | 10/2007 | Sakaguchi et al. ......... 703/1 |

OTHER PUBLICATIONS

Sheffer et al.; ABF++: Fast and Roust Angle Based Flattening, ACM Transactions on Graphics, vol. 24, No. 2, Apr. 2005, pp. 311-330.*

* cited by examiner

*Primary Examiner* — Edward Martello
(74) *Attorney, Agent, or Firm* — Schwegman Lundberg & Woessner, P.C.

(57) ABSTRACT

Disclosed is a method for flattening a 3D surface into a 2D piece. In one embodiment, the method is implemented by constructing a plurality of wire-patches by feature curves on a surface patch of the 3D surface, wherein each of feature curves comprises a plurality of wire-nodes; computing an optimal 2D angle for each of said wire-nodes of the constructed wire-patches; determining an optimal position for each of said wire-nodes based on the computed optimal 2D angles thereof, respectively; and laying out each of said feature curves in 2D based on the determined optimal position. A device to flatten a 3D surface into a 2D piece is also provided.

16 Claims, 5 Drawing Sheets

METHODS FOR FLATTENING A 3D SURFACE INTO A 2D PIECE

TECHNICAL FIELD

This application relates to a method for flattening a 3D surface into a 2D piece and a device therefore.

BACKGROUND OF THE INVENTION

For the design and manufacturing companies in various industries, where the fabrication of their products needs to warp 2D sheet material (e.g., metal in ship industry, fabric in apparel industry and toy industry, and leather in shoe industry and furniture industry) into a 3D shape without any a stretching, it becomes a bottleneck to determine a shape of 2D pieces according to a designed 3D surface patch in the design and manufacturing cycle now. The problem of surface flattening (or parametrization) is usually formulated under a constrained optimization framework, the resultant 3D patch generally is not a developable surface and its length is not invariant. For an engineering application like a 3D garment design and manufacturing, this length variation will lead to many problems if pieces are sewed together, and the garment shape and designed fit will be affected.

In industries whose products are fabricated from planar pieces of sheet material, designers desire a surface flattening tool, which can preserve the length of boundaries and feature curves on a 2D piece according to its 3D surface patch. Although there are many different related approaches existing towards 3D modeling or surface flattening for pattern design, they are either time consuming or do not have the property of length preservation.

For example, there are some researches in literature which propose some approaches to focus on modeling or approximating a model with developable ruled surfaces (or ruled surfaces in other representations—e.g. B-spline or Bézier patches). However, these approaches can only model surface patches with 4-sided boundaries and it is difficult to use these approaches to model freeform surfaces as the surfaces are usually not defined on a square parametric domain. Although trimmed surfaces can be considered, the modeling ability for freeform objects by this category of approaches is still very limited. In short, the proposed approaches can only design the objects with relative simple shapes.

An ideal surface flattening of a given 3D surface patch P to be flattened to its corresponding 2D flattened piece D preserves the distances between any two points. That is, an isometric mapping is needed mathematically. However, this property is only held on those developable surfaces. Therefore, the existing surface flattening approaches always evaluate the error of distance variations between surface points on P and D, and try to minimize this error under a non-linear optimization framework. Unfortunately, the computation of non-linear optimization in terms of vertex position is very time-consuming and can hardly preserve the invariant lengths of feature curves.

Another interesting category of surface flattening approaches solves the problem by computing mappings for dimensionality reduction or through a multidimensional scaling (MDS) technique. These approaches are all based on computing an optimal mapping that projects the geodesic distances on surfaces into Euclidean distances in $R^2$ (i.e. for a lower dimension space). Nevertheless, it is difficult to embed the hard constraints on the length of feature curves in the mapping computation.

For length preservation of feature curves, J. R. Manning suggested the idea of preserving the length of feature curves on a network in "Computerized pattern cutting: methods based on an isometric tree", Computer-Aided Design, Vol. 12, No. 1, PP. 43-47, 1980, wherein an isometric tree consisting of a network of curves that are mapped onto the plane isometrically is introduced. However, this network is with the tree topology and the isometric curves are the branches of the tree which are flattened one by one without considering the relationship between these curves.

In the document "Piecewise surface flattening for non-distorted texture mapping" published in Computer Graphics, Vol. 24, No. 4, PP. 237-246, 1991, Bennis et al. mapped isoparametric curves onto plane followed by a relaxation process to position the surface between them and employed a progressive algorithm to process complex surfaces; however, the relationship between these isoparametric curves was not well addressed.

In the document "Geodesic curvature preservation in surface flattening through constrained global optimization", Computer-Aided Design, Vol. 33, No. 8, PP. 581-591, 2001, Azariadis and Aspragathos also proposed a method for optimal geodesic curvature preservation in surface flattening with feature curves. Nevertheless, as it was based on an optimization in terms of vertex positions, it is highly nonlinear and cannot be efficiently solved.

In literature, some approaches directly model developable (or flattenable) surfaces in $R^3$ instead of computing a surface flattening mapping. As proposed in the document "Virtual garments: a fully geometric approach for clothing design", Computer Graphics Forum (Eurographics'06 Proceedings), Vol. 25, No. 3, PP. 625-634. 2006, a given mesh surface is processed by fitting a conical surface locally at every vertex so that expected normal vectors can be determined. More generally, the discrete definition of Gaussian curvature has been adopted to define the measurement for the developability on given polygonal mesh surfaces in "Achieving developability of a polygonal surface by minimum deformation: a study of global and local optimization approaches", The Visual Computer, Vol. 20, No. 8-9, PP. 521-539, 1052, where a constrained optimization approach was conducted to deform mesh surfaces to increase their discrete developability. Liu et al. presented a novel PQ mesh in "Geometric modeling with conical meshes and developable surfaces", ACM Transactions on Graphics, Vol. 25, No. 3, PP. 681-689, 2006, which can be used to model developable surfaces in strips. Recently, a FL mesh modeling scheme which models developable mesh surfaces with a more complicated shape has been presented. However, it is never easy to modify any of these approaches so that they can process a surface from non-developable to developable while preserving the length of feature curves. Besides, the computation is much slower.

Therefore, a fast surface flattening approach which can warp a given 3D surface into 2D with the lengths of edges of its boundaries and feature curves being preserved is in a great need.

SUMMARY OF THE INVENTION

Disclosed is a method for flattening a 3D surface into a 2D piece, comprising:

constructing a plurality of wire-patches by feature curves on a surface patch of the 3D surface, wherein each of feature curves comprises a plurality of wire-nodes;

computing an optimal 2D angle for each of said wire-nodes of the constructed wire-patches;

determining an optimal position for each of said wire-nodes based on the computed optimal 2D angles thereof, respectively; and laying out each of said feature curves in 2D based on the determined optimal position.

Disclosed also is a device for flattening a 3D surface into a 2D piece, comprising:

a constructing unit configured to construct a plurality of wire-patches in a 3D surface and order the constructed wire-patches as a queue, the queue defining a warping order for the plurality of wire-patches;

a warping unit configured to warp each of the plurality of wire-patches according to the warping order so as to determine an optimal position in 2D for each of said wire-nodes; and a laying unit configured to lay out each of feature curves in 2D based on the determined optimal position for each of the wire-nodes.

DETAILED DESCRIPTION OF THE INVENTION

First of all, some necessary definitions for terms used in this description are given as below.

Feature curves are piecewise linear curves formed by polygonal edges on a given piecewise linear surface patch to be flattened. In particular, each of Feature curves comprises one or more segments, wherein each of the segments is required to have the same length on the piecewise linear surface patch and a flattened piece.

For a feature curve, if its planar shape on the flattened piece has been predefined, it is named as a key feature curve. Other feature curves are called accessory feature curves, whose planar shapes are determined by minimizing the variation between a surface angle and a planar angle at each endpoint of the segments.

Each region circled by feature curves on the given surface patch is defined as a wire-patch. The given surface patch can be segmented into several wire-patches. The boundary of each of the wire-patches comprises a plurality of feature curves and is recorded by a list of wire-nodes, where each wire-node is coincident with a vertex on one of the feature curves.

For three neighboring wire-nodes $q_{i-1}$, $q_i$ and $q_{i+1}$ on a same wire-patch, $\alpha_i$ is employed to represent the surface angle formed by a first line between $q_{i-1}$ and $q_i$ and a second line between $q_i$ and $q_{i+1}$. The corresponding 2D angle associated with the wire-node $q_i$ is denoted by $\theta_i$.

Figure 1:
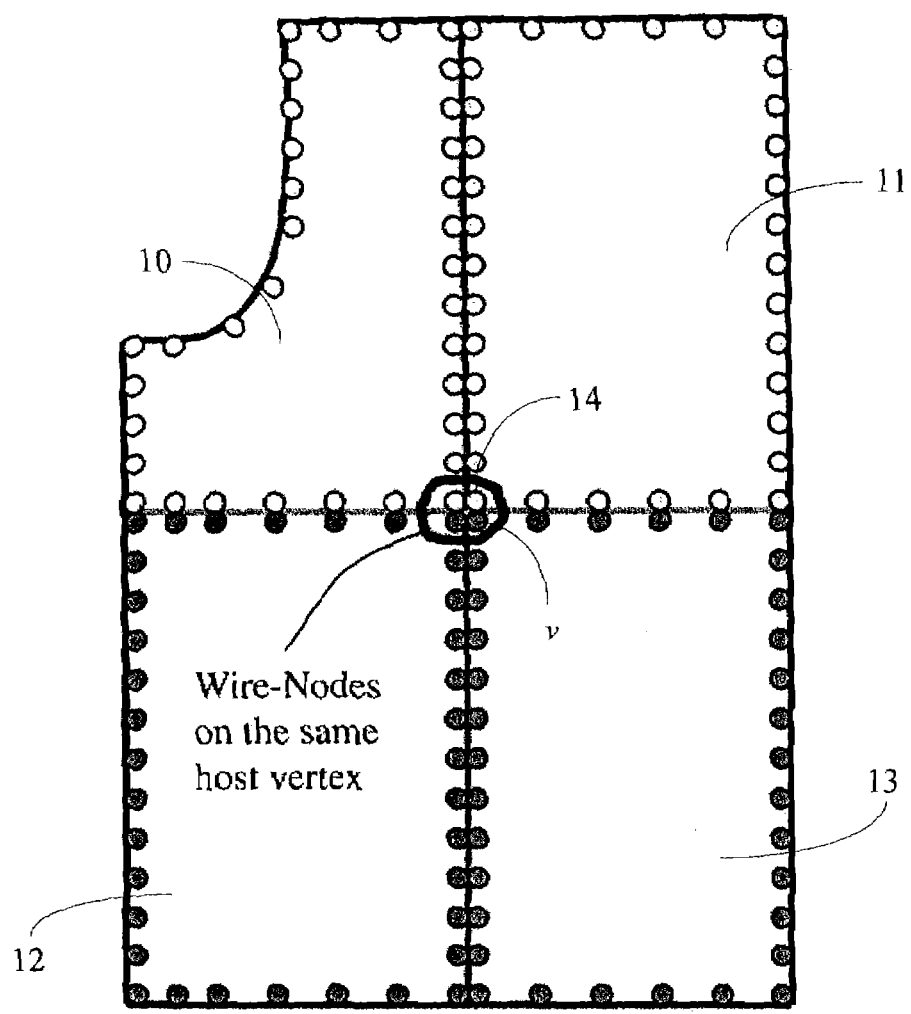
FIG. 1 is an illustration of four wire-patches to be warped.

Referring to FIG. 1, an illustration for four wire-patches 10-13 on a surface patch P and wire-nodes 14 thereon are shown. For a vertex on a feature curve, it may have more than one wire-nodes attached, such as the vertex v surrounded by the circle shown in FIG. 1 has four wire-nodes. The number of wire-nodes associated with a surface vertex is equal to the number of wire-patches adjacent to the vertex.

A wire-curve is defined by an ordered list of directional edges on the surface patch P, which separates two neighboring wire-patches. It is obvious that the wire-curves are coincident to feature curves, and the boundary of one wire-patch consists of several wire-curves in general.

In this document, there are disclosed two warping schemes for flattening a 3D surface into a 2D piece, i.e. a progressive warping scheme and a global warping scheme, which will be discussed as follows, respectively.

1. Progressive Warping Scheme

A progressive warping approach 1000 according to one embodiment of the present invention will be described in detail with reference to FIG. 2. This approach is adapted to surface patches that are nearly developable and is flexible for local shape control on feature curves.

Figure 2:
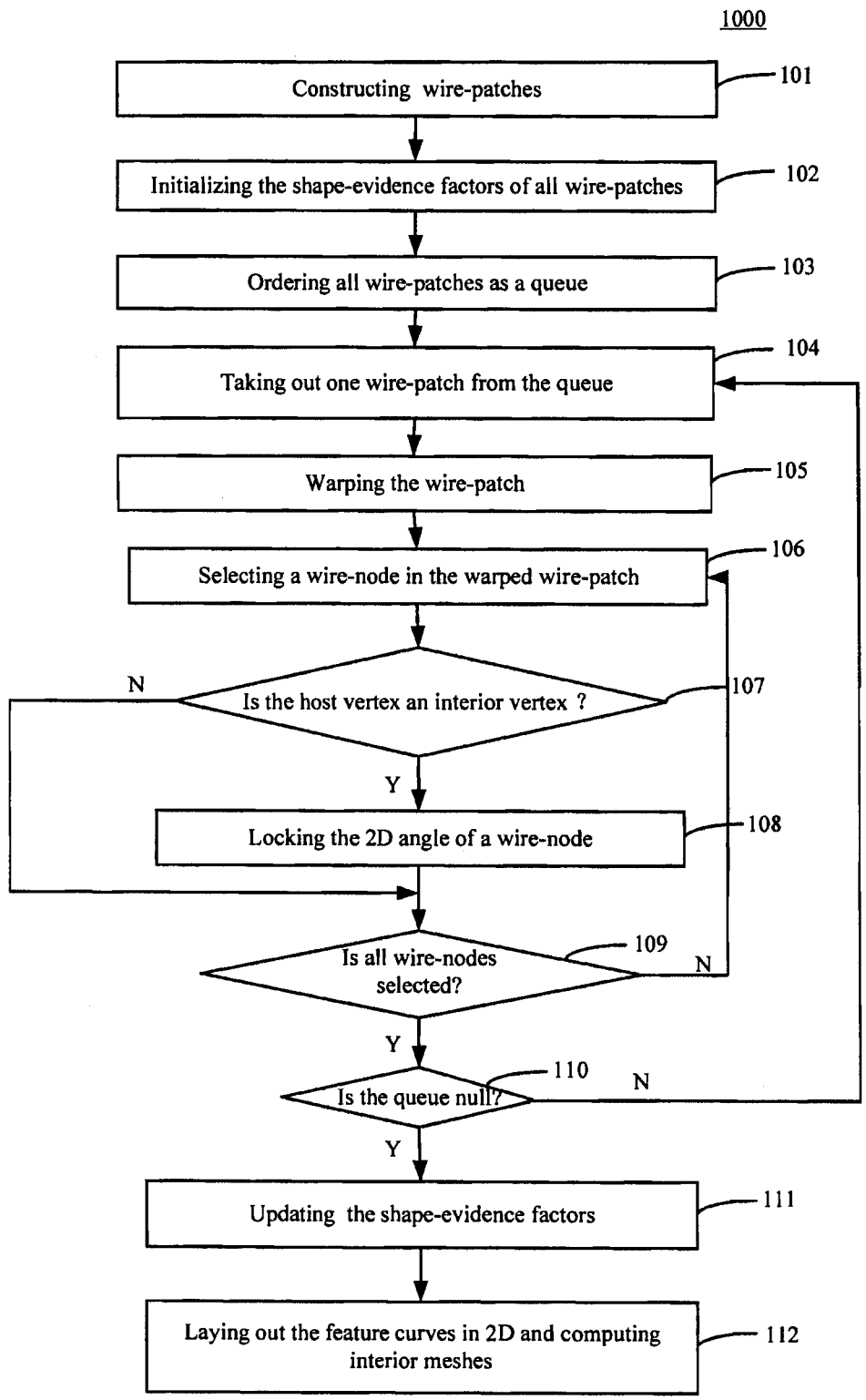
FIG. 2 illustrates a flowchart of a progressive warping approach according to one embodiment of the present invention.

As shown in FIG. 2, at step 101, wire-patches are constructed by feature curves on a given surface patch P of a 3D surface. At step 102, shape-evidence factors of all the wire-patches are initialized. For each given wire-patch, its shape-evidence factor is defined as:

$$l(P_i) = n'/n \qquad (1)$$

where n' is the number of wire-nodes on the given wire-patch whose 2D angles are known and n is the number of all wire-nodes on the given wire-patch. Based on the shape-evidence factors of all the wire-patches, at step 103, all the wire-patches are ordered as a queue, which is, for example, a maximum heap keyed by the shape-evidence factor, and the warping order of the wire-patches is determined according to the queue.

After the warping order is determined, at step 104, one wire-patch is taken out from the top of the queue. The wire-patch took out is the one who has the maximum shape-evidence factor among all the wire-patches. Then, the wire-patch is warped at step 105. The warping of the wire-patch is to be described in detail with reference to FIG. 3.

Following step 105, a wire-node in the warped wire-patch is randomly selected at step 106. Then, at step 107, the process 1000 determines whether the host vertex holding the selected wire-node is an interior vertex (a vertex which is not on the boundary of a given surface) on the wire-patch P and 2D angles of all wire-nodes around the host vertex but a wire-node q have been known. If it is not the case, the process 1000 goes to step 109 directly. Otherwise, the 2D angle of the wire-node q is locked and stored at step 108. Let $\hat{Q}(q) = \{q_k \in v(q)\} \setminus \{q\}$ represents a set of wire-nodes associated with the host vertex v(q) except q, and $\Gamma$ is defined as a set of all wire-patches holding the wire-nodes in $\hat{Q}(q)$. Since 2D angles of all wire-nodes in $\hat{Q}(q)$ have been known (for example, when all wire-patches in F have been warped into plane), the 2D angle of q is locked as $$\theta(q) = 2\pi - \sum_{q_k \in \hat{Q}(q)} \theta(q_k) \qquad (2)$$

Otherwise, the flattened wire-patches around v(q) will not be compatible to each other.

At step 109, the process 1000 determines whether all the wire-nodes in the warped wire-patch have been selected.

If it is determined that all the wire-nodes in the warped wire-patch have been selected at step 109, the process 1000 goes to step 110 to further determine whether all wire-patches haven been taken out and thus the queue is null. Otherwise, the process 1000 goes back to step 106 to select another wire-node in the warped wire-patch. For example, the wire-nodes are anticlockwise selected.

If it is determined that the queue is null at step 110, the shape-evidence factors of all wire-patches neighboring to the warped wire-patch is updated and so is the queue. Otherwise, the process 1000 goes back to step 104 and another wire-patch is taken out from the top of the queue.

Following the step 111, the feature curves are laid out in 2D and interior meshes of each wire-patch are computed and laid out at step 112. The laying out of the feature curves and interior meshes of the wire-patch is to be described in detail later with reference to FIG. 4.

Thus, after all wire-patches are processed according to the above steps, the given surface is warped in to a 2D piece progressively.

Hereinafter, the warping of a wire-patch P at step 105 is described in detail with reference to FIG. 2.

At step 1051, optimal 2D angles of wire-nodes on the wire-patch on the surface patch P took out from the queue are computed according to a constrained optimization, as presented by Eq. (3).

In order to make the feature curves on the surface patch P to be flattened with the lengths of boundaries of the wire-patch being preserved, during flattening, edges on boundary of the wire-patches should be simulated as tendon wires, and surface-angle variations between the edges and the tendon wires should be minimized. Therefore, the shape of a warped wire-patch in 2D is similar to its shape on the surface patch P.

Based on the above requirements, the optimal planar boundary of the wire-patch, which is actually formed by the edges on feature curves, can be computed under a constrained optimization framework as follows.

$$\min_{\theta_i} \sum_{i=1}^{n} \frac{1}{2}(\theta_i - \alpha_i)^2 \quad (3)$$

$$\text{s.t.} \quad n\pi - \sum_{i=1}^{n} \theta_i \equiv 2\pi,$$

$$\sum_{i=1}^{n} l_i \cos\phi_i \equiv 0,$$

$$\sum_{i=1}^{n} l_i \sin\phi_i \equiv 0$$

wherein, $q_i$ represents a wire-node of which optimal 2D angle is to be computed, $\theta_i$ is the 2D angle associated with the wire-node, $\alpha_i$ represents a 3D surface angle of the wire-node, $l_i$ denotes a length of an edge on a boundary of the wire-patch where the wire-node $q_i$ locates, $\phi_i$ represents a turning angle of an edge on the boundary of a wire-patch, and n is the number of wire-nodes on the boundary.

It should be noted that the angle variation term is set as a soft constraint in the objective function, and the length invariant term is assigned as a hard constraint. In this manner, the angle variation under the length invariant is formulated in an angle space which greatly simplifies the computation.

Figure 3:
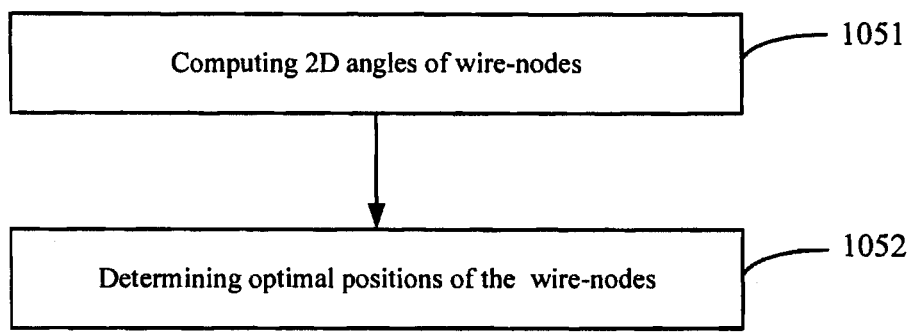
FIG. 3 illustrates a flowchart of a process for warping a given wire-surface into a 2D piece according to one embodiment of the present invention.

For a simple non-self-intersection planar closed path, if its path is anti-clockwise, the total turning of any vertex on the path must be $2\pi$. The total turning by accumulating vertex turning angles may be computed by $$\sum_{i=1}^{n} (\pi - \theta_i),$$

which leads to the first constraint $n\pi - \Sigma_i \theta_i \equiv 2\pi$. The last two constraints in Eq. (3) are derived from the position coincidence requirement. As shown in FIG. 3, by giving the inner turning angles $\theta_i$s and placing the wire-node q1 at the origin, the planar coordinate $(x_i, y_i)$ of a wire-node $q_i$ becomes $$x_i = \sum_{k=1}^{i-1} l_k \cos\phi_k \text{ and } y_i = \sum_{k=1}^{i-1} l_k \sin\phi_k.$$

In addition, $\theta_i = 2\pi - (\phi_i - \beta)$ at the wire-node $q_i$ and $\beta = \phi_{i-1} - \pi$ at the wire-node $q_{i-1}$, which yields $$\phi_i = \pi - \theta_i + \phi_{i-1} \quad (4)$$

With $\phi_1 = \pi - \theta_1$, the general formula for $\phi_i$ can be derived as $$\phi_i = i\pi - \sum_{b=1}^{i} \theta_b.$$

In order to ensure the boundary of a wire-patch being closed, $(x_{n+1}, y_{n+1})$ must be coincident with the origin, which leads to the last two constraints in Eq. (3).

After the optimal values of $\theta_i$ are computed, the values of $\phi_i$ can be determined. Therefore, the optimal position of every wire-node is determined at step 1052 by $$q_{i+1} = q_i + (l_i \cos\phi_i, l_i \sin\phi_i)^T \quad (5)$$

Thus, the wire-patch took out from the queue is warped.

It is noted that the computation of the optimal planar boundary for the wire-patch may need to lock the values of 2D angles at some wire-nodes. For example, if the wire-node $q_i$ is located on a key feature curve with its 2D shape specified by designers, an optimal value $\hat{\theta}_i$ at $q_i$ is given.

Figure 4:
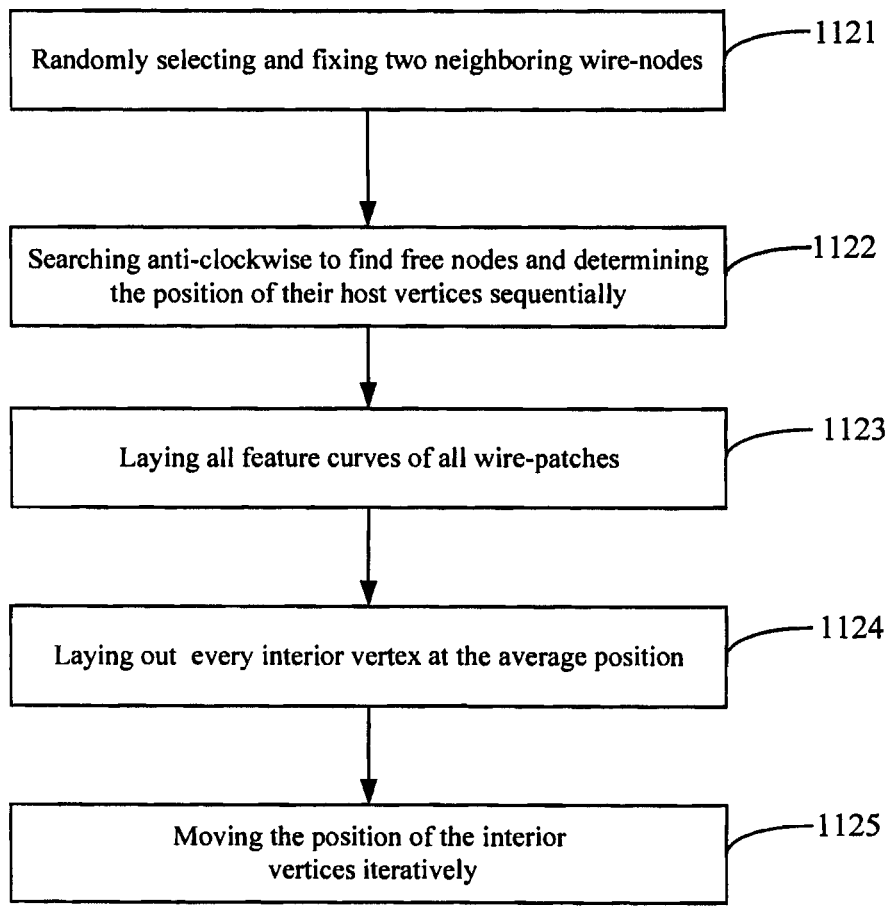
FIG. 4 illustrates a flowchart of a process for laying out the feature curves and interior meshes of the warped wire-patches according to one embodiment of the present invention.

Hereinafter, the laying out of the feature curves and interior meshes of each wire-patch is described with reference to FIG. 4.

In order to lay out feature curves, the wire-patches need to be reordered by propagation and stored in a list. The reordered order of wire-patches is determined by a flooding algorithm, wherein the reordered list is starting random from any wire-patch adjacent to feature curves, then its neighboring patch, and then the neighbor of its neighboring patch and so on. With the wire-patches ordered in the list, the host vertices of the wire-nodes can be placed patch by patch.

On a given mesh surface to be flattened, a host vertex could be an interior vertex or a boundary vertex, wherein the boundary vertex is a vertex on the boundary of the given surface to be flattened and the interior vertex is a vertex not on the boundary of the given surface. The boundary of the wire-patch is actually formed by the edges on feature curves. Every vertex on the given mesh surface to be flattened is a mesh vertex; if it is not on the boundary, it is an interior vertex then.

When laying out the wire-patches and their interior meshes in 2D, the feature curves are placed first, since the boundaries of the wire-patches are actually formed by the edges on the feature curves. Then, the positions of the interior mesh vertices (interior vertices) are computed with the fixed boundaries of the wire-patches and the interior vertex of the wire-patches are placed. The steps for laying out the feature curves and interior meshes of a warped wire-patch are described in detail as follow.

Since the feature curves are defined by wire-nodes, the wire-nodes need to be laid out at first and thus the feature curves are lard out accordingly. The wire-nodes in a wire-patch are classified into two types: fixed nodes whose host vertices' 2D positions have already been known and free nodes whose host vertices have not been placed yet. Since no fixed wire-node can be found on the first wire-patch in the list, two neighboring wire-nodes are randomly chosen from the first wire-patch and are fixed in 2D at step 1121 by reserving the distance between them. At step 1122, the wire-nodes in the wire-patch are searched anti-clockwise from the fixed nodes to find the free nodes sequentially. The position of the host vertex of a free node may be determined by Eq. (5) with the positions of the host vertex of the two former fixed nodes, the edge length of the host vertices of the free node and the fixed node adjacent to the free node in 3D, and the optimal 2D angle of the fixed node adjacent to the free node. When the position of the host vertex of the free node is determined, the feature curves between the free node and the corresponding fixed wire-node is laid out accordingly.

After that, the free node becomes a fixed node. Similarly, other free nodes on this wire-patch may be laid out consecutively.

At step 1123, all feature curves are laid out in this way sequentially according to the reordered order as described above.

Finally, the mesh vertices not associated with any wire-node (i.e. the interior vertices of the wire-patches) need to be positioned in 2D to generate a correct mesh surface representation. At step 1124, every interior vertex $v_i$ of each wire-patch is first laid out at the average position of the boundary vertices of the corresponding wire-patch. Next, at step 1125, the positions of $v_i$ are moved iteratively by the operator $$v_i^{new} \leftarrow \frac{1}{w(v_i)} \sum_{j \in N(v_i)} \|v_i v_j\|^{-1} v_j, \quad (6)$$

where $\| \ldots \|$ denotes the distance of two vertices on the given surface, $N(v_i)$ represents 1-ring neighbors of the vertex $v_i$, and $w(v_i)$ is a summed weight.

To further speed up the computation, a relaxing factor may be introduced, which reduces the number of iteration steps by about two third in most examples. Since the use of the relaxing factor is common in the art, the detailed discussion thereof is omitted herein.

2. Global Warning Scheme

Figure 5:
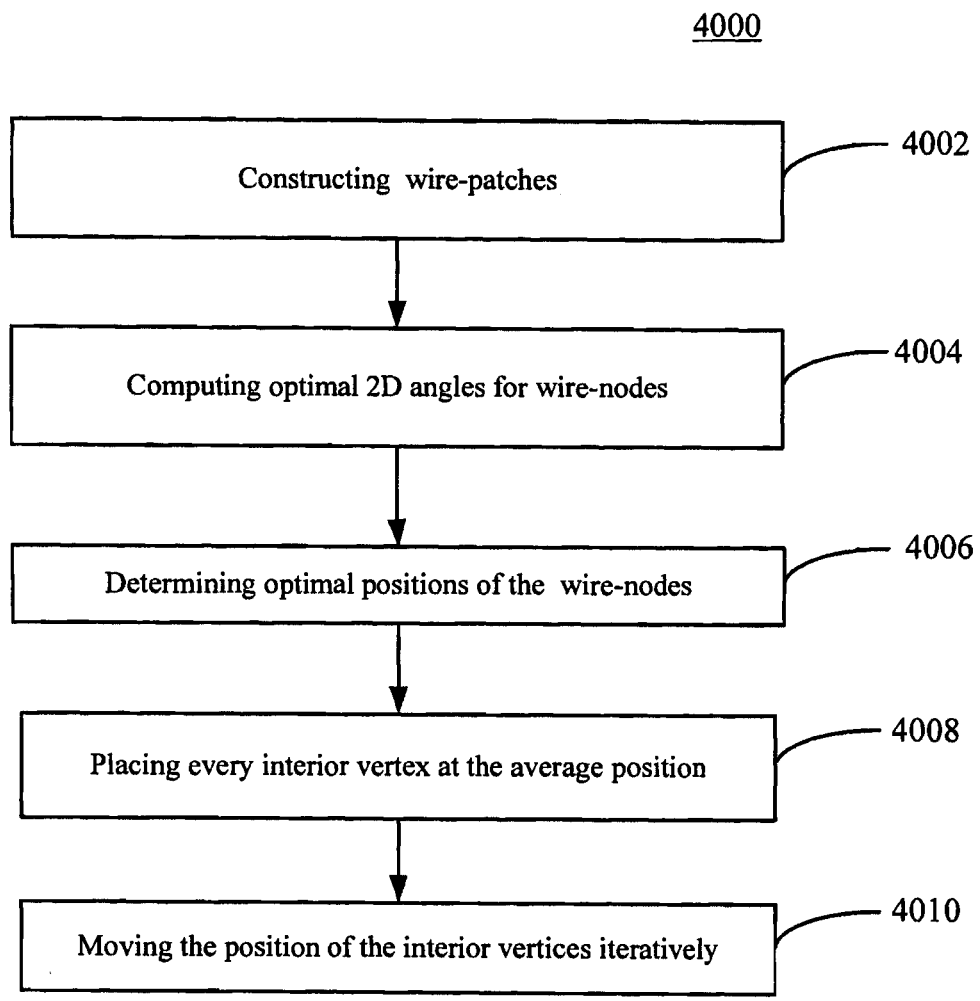
FIG. 5 illustrates a flowchart of a global warping approach according to another embodiment of the present invention.

Referring to FIG. 5, an illustrated flowchart of a global warping approach 4000 according to another embodiment of the present invention is shown. This approach is adapted to flatten highly curved surfaces. For surfaces that are far from developable, using the progressive warping scheme for flattening will lead to great distortion occurred on the given warped wire-patch since this scheme will accumulate the distortions on the warped wire-patches from the first warped one to the last warped one. Therefore, the global warping scheme is developed for highly curved surfaces.

To compute a flattening of wire-patches by means of the global warping, constrained optimizations for all wire-patches are integrated into a consistent constrained optimization to warp all the wire-patches together. In addition to the closed path constraint and the position coincident constraints, the compatibility constraint is introduced so that the sum of 2D angles of the wire-nodes associated with an interior host vertex v is $2\pi$.

Without loss of generality, wire-patches are firstly constructed by the feature curves on a given surface patch at step 4002. If there are total m wire-patches constructed on the given surface patch P, we have $$\sum_{p=1}^{m} n_p$$

wire-nodes, where $n_p$ represents the number of wire-nodes for the wire-patch $P_p$ whose index is p. As all wire-patches will be warped together, every wire-node will have one local index in the wire-patch and another global index, which will be described in detail later. To simplify the expression, a permutation function $\Gamma_p(b)$ for returning the global index of a wire-node on the wire patch $P_p$ with the local index b and its inverse function $\Gamma_p^{-1}(j)$ that gives the local index of a wire-node $q_j$ on the wire-patch $P_p$ are defined. At step 4004, the constrained optimal 2D angles for wire-nodes on all the constructed wire-patches are computed so that the global distortion of flattening is minimized, which can be formulated as follows.

$$\min_{\theta_i} \sum_i \frac{1}{2} (\theta_i - \alpha_i)^2 \quad (6)$$

s.t.

$$n_p \pi - \sum_{b=1}^{n_p} \theta_{\Gamma_p(b)} \equiv 2\pi \ (\forall \ p = 1, \ldots, m)$$

$$\sum_{b=1}^{n_p} l_b \cos\phi_b \equiv 0, \sum_{b=1}^{n_p} l_b \sin\phi_b \equiv 0, (\forall \ p = 1, \ldots, m)$$

$$\sum_{q_k \in v} \theta_k \equiv 2\pi \ (\forall \ v \in \Phi)$$

where $q_i$ represents a wire-node of which optimal 2D angle is to be computed, $\Phi$ represents the collection of interior vertices on accessory feature curves, $\theta_i$ is the 2D angle associated with the wire-node $q_i$, $\alpha_i$ represents a 3D surface angle associated with the wire-node $q_i$, $\phi_b$ represents a turning angle of an edge on the boundary of a wire-patch, and $l_b$ denotes a length of an edge on the feature curves.

By the sequential linearly constrained programming, the constrained optimization problem can be solved in a Newton's approach by solving a sequence of sparse linear equations. When a surface is flattened by using the Newton's algorithm, the computation is stared by letting $\theta_i = \alpha_i$, and the Newton's algorithm always stops in less than 10 iterations. The Newton's algorithm is shown as follows, while $\|\delta_\theta\|^2/n > 10^{-8}$ do
Solve $\nabla^2 J(X)\delta = -\nabla J(X)$;

$X \leftarrow X + \delta$ end while.

As stated above, every wire-node has one local index and another global index. For each wire-node, it is very easy to determine its row and column in a final linear equation system, i.e. the sparse linear equation system in the $2^{nd}$ step of the above Newton's algorithm, by using these two indices. After its column and row index are known, corresponding coefficients may be inserted into the linear equation system and then iteratively solve it to determine the optimal 2D angles. In addition, it is also very easy to evaluate the value of angle associated with the wire-node. With the two indices, it is efficient to implement the numerical computation of this optimization problem.

In step 4006, the planar coordinates of vertices on feature curves are computed in a manner similar to that used in the step 1052 of the progressive warping. In the steps 4008 and 4010, the interior vertices are placed in 2D in the same way as that used in the steps 1123 and 1124. It should be noted that when using $\phi_i = \pi\theta_i + \phi_{i,1}$ to compute the value of $\phi_i$ from $\theta_i$s, the 2D angles of locked wire-nodes should be included since they also contribute to the shape of every wire-patch.

According to the present invention, the following two error terms, i.e. edge-length error and angle error, are computed for measuring the results of flattening.

1. Edge-Length Error

The length variation of edges on the feature curves is measured by $$E_{len} = \frac{1}{N(\Omega_e)} \sum_{e \in \Omega_e} \frac{|l_e^0 - l_e|}{l_e^0}, \quad (7)$$

where $\Omega_e$ is the set of edges on all feature curves, $N(\ldots)$ defines the number of elements in a set, $l_e^0$ is the length of the edge e in 3D, and $l_e$ is its length in 2D.

2. Angle Error

The angle variation of all polygons on the given piecewise linear surface is measured as $$E_{ang} = \frac{1}{N(\Omega_a)} \sum_{a \in \Omega_a} \frac{|\vartheta_a^0 - \vartheta_a|}{\vartheta_a^0}, \quad (8)$$

with $\Omega_a$ as the collection of all polygonal angles on the given mesh surface P, and $\theta_a^0$ and $\theta_a$ are values of the polygonal angle a in R3 and R2, respectively.

For an ideal flattening result, it should let both $E_{len}$ and $E_{ang}$ be zero. However, these two error terms in general are not compatible to each other on a non-developable surface. The results of the method according to the present invention preserve $E_{len} = 0$ and try to minimize the value of $E_{ang}$.

Both the progressive warping scheme and the global warping scheme according to the present invention can compute a flattened patch while preserving the length of edges on feature curves. The global warping scheme gives less angle distortion since it actually distributes the distortion error to all wire-patches but the progressive warping scheme accumulates the error. Also, both the progressive warping scheme and the global warping scheme can be implemented in an interactive speed.

Figure 6:
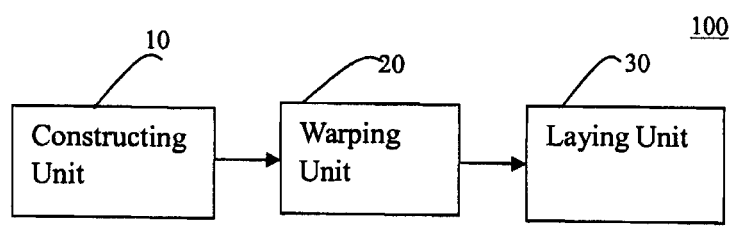
FIG. 6 illustrates exemplarily a device of flattening a 3D surface into a 2D piece according to one embodiment of the present invention.

FIG. 6 illustrates exemplarily a device 100 of flattening a 3D surface into a 2D piece according to one embodiment of the present invention.

The system 100 comprises a constructing unit 10, a warping unit 20 and a laying unit 30.

The constructing unit 10 is configured to construct a plurality of wire-patches a 3D surface. The wire-patches are defined by feature curves on a given surface patch of the 3D surface. For each given wire-patch, a shape-evidence factor is initialized according to equation (1). Based on the shape-evidence factors of all the wire-patches, the constructing unit 10 operates to order all the wire-patches as a queue, which is, for example, a maximum heap keyed by the shape-evidence factor, and the warping order of the wire-patches is determined according to the queue.

The warping unit 20 is configured to warp the wire-patches according to the warping order determined by the unit 10 so as to determine an optimal position for respective wire-nodes. In particular, the warping unit 20 may have two warping schemes, i.e. a Progressive warping scheme and a Global warping scheme. Since those two schemes have been discussed in reference to FIGS. 3 and 4, respectively, the detailed description thereof is thus omitted.

The laying unit 30 is configured to lay out each of feature curves in 2D based on the determined optimal position for respective wire-nodes. The laying out for the unit 30 is similar to those steps of FIG. 4, and the detailed description thereof is thus omitted.

While the constructing unit 10, the warping unit 20 and the laying unit 30 are shown in FIG. 6 and described herein as three separate units, the invention is not limited thereto. It should be understood that the units 10, 20 and 30 may be integrated into one chip or arranged into multiple units separately, and may be implemented either by software or hardware, or the combination of software and hardware.

Though embodiments and implementations of the invention have been shown and described, it should be understood that various other changes in form and details may be made therein without departing from the spirit of the invention.

The invention claimed is:

1. A method for flattening a 3D surface into a 2D piece, comprising:
    constructing, by a constructing unit integrated into a chip, a plurality of wire-patches by feature curves on a surface patch of the 3D surface, wherein each of feature curves comprises a plurality of wire-nodes;
    computing an optimal 2D angle for each of said wire-nodes of the constructed wire-patches;
    determining an optimal position for each of said wire-nodes based on the computed optimal 2D angles thereof, respectively; and
    laying out each of said feature curves in 2D based on the determined optimal position, wherein the optimal 2D angle for each of said wire-nodes is computed based on a constraint that edges on a boundary of the wire-patches in which said wire-nodes are located are simulated as tendon wires with length preserved, and surface-angle variations between the edges and the tendon wires are minimized.

2. A method of claim 1, wherein the computing is based on a queue consisting of the plurality of wire-patches.

3. A method of claim 2, wherein the queue is ordered based on shape-evidence factors of the plurality of wire-patches.

4. A method of claim 3, wherein the shape-evidence factors are formed by rule of $$l(P_i) = n'/n$$

where n' is the number of the plurality of wire-nodes on the wire-patch whose 2D angles are known, and n is the number of all wire-nodes on the wire-patch.

5. A method of claim 1, wherein the computing is carried out by a rule of $$\min_{\theta_i} \sum_{i=1}^{n} \frac{1}{2}(\theta_i - \alpha_i)^2$$

$$\text{s.t.} \quad n\pi - \sum_{i=1}^{n} \theta_i \equiv 2\pi,$$

$$\sum_{i=1}^{n} l_i \cos\phi_i \equiv 0,$$

$$\sum_{i=1}^{n} l_i \sin\phi_i \equiv 0$$

wherein,
i represents a local index of a wire-node $q_i$ whose optimal 2D angle is to be computed,
$\theta_i$ is the 2D angle associated with said wire-node,
$\alpha_i$ represents a 3D surface angle associated with said wire-node,
$l_i$ denotes a length of an edge on a boundary of the wire-patch where the wire-node $q_i$ locates,
$\phi_i$ represents a turning angle of an edge on the boundary of the wire-patch, and
n is the number of wire-nodes on the boundary.

6. A method of claim 1, wherein the laying out further comprises:
randomly selecting two neighboring wire-nodes from one of the plurality of wire-patches;
fixing the selected two wire-nodes in 2D by reserving a distance therebetween;
searching the wire-nodes from the fixed nodes to find a free node in said one of wire-patches;
fixing a position of a host vertex of the searched free node; and
laying out one of the feature curves between the searched free node and the fixed node adjacent thereto.

7. A method of claim 6, further comprising:
determining a position of a host vertex of the free node with the determined optimal position, an edge length of the host vertices of the free node and the fixed node adjacent to the free node in 3D, and the computed optimal 2D angle for the fixed node adjacent to the free node.

8. A method of claim 1, wherein each of the wire-patches further comprises a plurality of interior vertices, the method further comprising:
laying out each of said interior vertices in 2D based on the laid feature curves.

9. A method of claim 8, wherein laying out each of said interior vertices further comprises:
laying out each of said interior vertices of each of said wire-patches at an average position of said feature curves; and
moving the position of each of said interior vertices in place iteratively.

10. A method of claim 1, wherein the computing is carried out by a rule of $$\min_{\theta_i} \sum_{i} \frac{1}{2}(\theta_i - \alpha_i)^2$$

s.t.

$$n_p \pi - \sum_{b=1}^{n_p} \theta_{\Gamma_p(b)} \equiv 2\pi \, (\forall \, p = 1, \ldots, m)$$

$$\sum_{b=1}^{n_p} l_b \cos\phi_b \equiv 0, \sum_{b=1}^{n_p} l_b \sin\phi_b \equiv 0, (\forall \, p = 1, \ldots, m)$$

$$\sum_{q_k \in v} \theta_k \equiv 2\pi \, (\forall \, v \in \Phi)$$

wherein
$\Phi$ represents a collection of interior vertices on the feature curves,
i represents a global index of wire-node q, whose optimal 2D angle is to be computed,
$\theta_i$ is a 2D angle associated with the wire-node $q_i$,
$\alpha_i$ represents a 3D surface angle associated with said wire-node,
$\phi_b$ represents a turning angle of an edge on the boundary of the wire-patch, and
$l_b$ denotes a length of an edge on the feature curves,
$\Gamma_p(b)$ is a function for returning the global index of the wire-node with its local index b,
p is an index of a wire-patch in the surface,
$n_p$ denotes the number of wire-nodes on the wire-patch whose index is p, and
v represents a vertex belonging to $\Phi$.

11. A device for flattening a 3D surface into a 2D piece, comprising:
a constructing unit integrated into a chip and configured to construct a plurality of wire-patches in a 3D surface and order the constructed wire-patches as a queue, the queue defining a warping order for the plurality of wire-patches;
a warping unit configured to warp each of the plurality of wire-patches according to the warping order so as to determine an optimal position in 2D for each of said wire-nodes; and
a laying unit configured to lay out each of feature curves in 2D based on the determined optimal position for each of the wire-nodes,
wherein the warping unit is configured to warp each of said wire-nodes based on a constraint that edges on a boundary of the wire-patches in which said wire-nodes are located are simulated as tendon wires with length preserved, and surface-angle variations between the edges and the tendon wires are minimized.

12. A device of claim 11, wherein the queue is ordered based on shape-evidence factors of the plurality of wire-patches.

13. A device of claim 12, wherein the shape-evidence factors are formed by rule of $$l(P_i) = n'/n$$

where n' is the number of the plurality of wire-nodes on the wire-patch whose 2D angles are known, and n is the number of all wire-nodes on the wire-patch.

14. A device of claim 11, wherein the warping unit is configured to determine said optimal position in 2D for each of said wire-nodes by an optimal 2D angle thereof, the optimal 2D angle being computed by a rule of $$\min_{\theta_i} \sum_{i=1}^{n} \frac{1}{2}(\theta_i \alpha_i)^2 \, s.t. n\pi - \sum_{i=1}^{n} \theta_i \equiv 2\pi, \sum_{i=1}^{n} l_i \cos\phi_i \equiv 0, \sum_{i=1}^{n} l_i \sin\phi_i \equiv 0$$

wherein,
i represents a local index of a wire-node $q_i$ whose optimal 2D angle is to be computed,
$\theta_i$ is the 2D angle associated with said wire-node, $\alpha_i$ represents a 3D surface angle associated with said wire-node, $l_i$ denotes a length of an edge on a boundary of the wire-patch where the wire-node $q_i$ locates, $\Phi_i$ represents a turning angle of an edge on the boundary of the wire-patch, and n is the number of wire-nodes on the boundary.

15. A device of claim 11, wherein the laying unit is configured to lay out each of feature curves in 2D by the following steps:

randomly selecting two neighboring wire-nodes from one of the plurality of wire-patches;

fixing the selected two wire-nodes in 2D by reserving a distance therebetween;

searching the wire-nodes from the fixed nodes to find a free node in said one of wire-patches;

fixing a position of a host vertex of the searched free node; and laying out a feature curve between the searched free node and the fixed node adjacent thereto.

16. A device of claim 11, wherein each of the wire-patches further comprises a plurality of interior vertices, and wherein the laying unit operates to lay out each of said interior vertices in 2D based on the laid feature curves.

* * * * *